A. C. BENNETT.
CARBURETER.
APPLICATION FILED JULY 19, 1907.

927,211.

Patented July 6, 1909.
2 SHEETS—SHEET 1.

WITNESSES:

INVENTOR.
Ashley C. Bennett

A. C. BENNETT.
CARBURETER.
APPLICATION FILED JULY 19, 1907.

927,211.

Patented July 6, 1909.
2 SHEETS—SHEET 2.

WITNESSES:

INVENTOR.
Ashley C. Bennett

UNITED STATES PATENT OFFICE.

ASHLEY C. BENNETT, OF MINNEAPOLIS, MINNESOTA.

CARBURETER.

No. 927,211.      Specification of Letters Patent.      Patented July 6, 1909.

Application filed July 19, 1907. Serial No. 384,527.

*To all whom it may concern:*

Be it known that I, ASHLEY C. BENNETT, a citizen of the United States, residing at Minneapolis, Minnesota, have invented a new and useful Carbureter, of which the following is a specification.

My invention relates to carbureters for explosive engines; and my object is to provide equalizing means whereby the combustible fluid is automatically drawn from the reservoir in direct proportion to the amount of air flowing, thus carbureting an aeriform fluid of uniform density, regardless of the rate of consumption.

An additional object of my invention is to provide neutralizing means, wherein the combustible fluid will not continue to flow instantly after the air draft is suddenly checked.

In the design of my carbureter, I have attained the utmost simplicity consistent to a high standard of efficiency, and my invention consists of the novel features herein shown, described and claimed.

Figure 1:
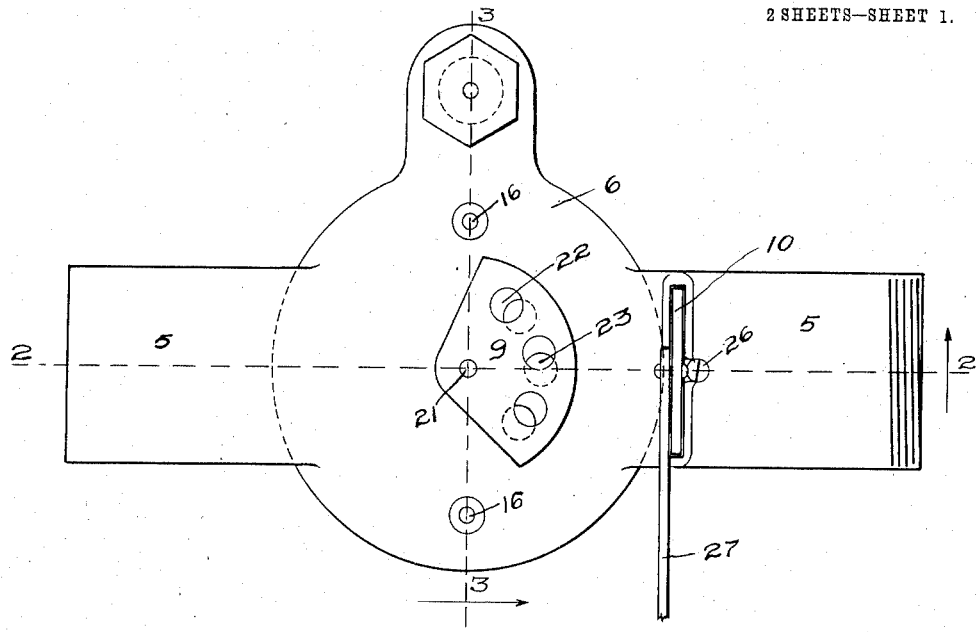
Figure 2:
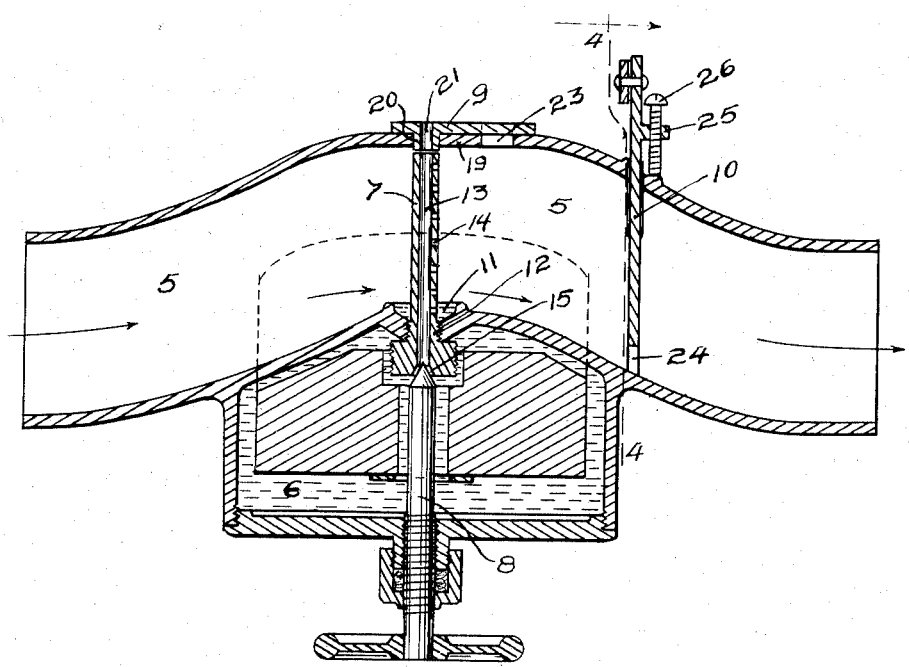
Figure 3:
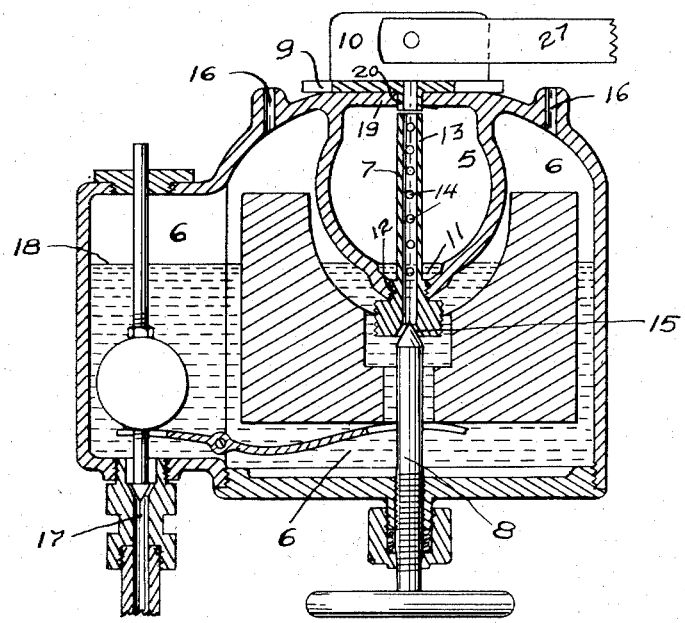
Figure 4:
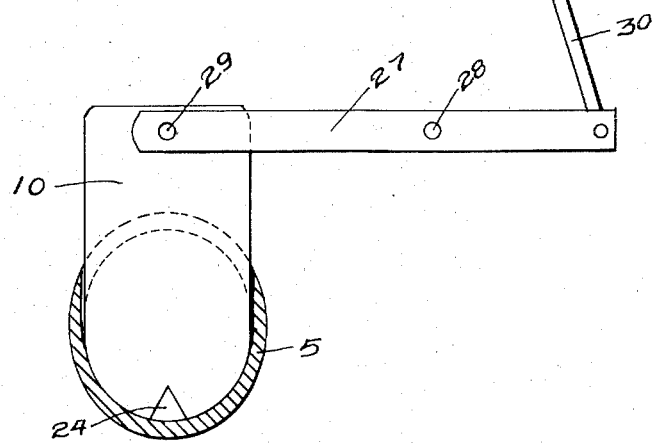

In the drawings, Figure 1 is a top plan view of a carbureter embodying the principles of my invention. Fig. 2 is a vertical longitudinal section taken on the line 2—2 of Fig. 1, and looking in the direction indicated by the arrow. Fig. 3 is a vertical cross-section taken on the line 3—3 of Fig. 1, and looking in the direction indicated by the arrow. Fig. 4 is a cross-section taken approximately on the line 4—4 of Fig. 2, looking in the direction indicated by the arrow, and showing a mechanism for operation.

Referring to the drawings in detail, my carbureter embodies; an air pipe or mixing chamber 5 extending through the upper portion of the reservoir 6; a stand pipe 7 vertically interposed within the air pipe and providing a gasolene supply therefor; a needle stem 8 in vertical alinement beneath the stand pipe, providing adjustment for the gasolene flow; rotatable air gate 9 in axial alinement above the stand pipe, for equalizing the mixture; and a throttle gate 10 interposed within the after part of the air pipe, for controlling the flow of aeriform fluid.

The air pipe 5 is upwardly curved at its central portion to crowd the air draft down upon a cup at the base of the stand pipe, the air flowing in the direction indicated by the arrows. A cup 11 is formed in the bottom of the upwardly curved portion of the air pipe, the base of said cup being vertically pierced and threaded to receive the threaded shoulder 12 of the stand pipe and secure it therein. This cup is adapted to retain a sufficient supply of gasolene to start the engine and run it at low speed.

A duct 13 extends throughout the entire length of the stand pipe from which extends a number of minute perforations 14 placed at suitable intervals, preferably extending toward the after part of the air chamber, said duct and apertures being the means whereby the gasolene may be drawn from the reservoir into the mixing chamber or cup. A valve seat 15 is formed in the base of the stand pipe, being a continuation of the duct 13, and is adapted to engage the regulating needle 8. Of the apertures 14 from the stand pipe, at least one should be placed below the top of the cup 11 and below the level of the liquid in the chamber 6, thereby permitting the gasolene to flow into the cup and normally maintain its level.

The regulating needle 8 is of the usual form and needs no detailed description herein. The reservoir 6 is provided with air vents 16 and an intake 17, the valve for said intake being controlled by an ordinary float mechanism for maintaining a gravity level, preferably at line 18 in the horizontal plane of the top of the cup 11.

An upper portion 19 of the air pipe is flattened forming a seat for the air gate 9 which is pivoted thereon by means of a downwardly projecting stem 20, said stem being vertically pierced to form a duct 21 which registers with the duct 13. When the gate 9 is properly turned however, the openings 22 through its wing portion will register with the openings 23 through the seat 19, thus providing adjustable means for admitting air into the after part of the air chamber, by which the richness of the gas may be varied according to the judgment of the operator.

The throttle gate 10 is preferably formed from sheet steel, its lower portion being rounded to conform with the shape of the air pipe; a vent 24 may be provided allowing sufficient gas to flow for running the engine at low speed with the gate in a closed position, said vent being preferably cut from the lower extremity of the gate thus drawing the air directly across the cup 11; a lug 25 is formed upon the side of the gate and is vertically pierced to receive the adjusting screw 26, by means of which the gate may be retained at any desired position for low speed running.

The gate may be operated by any combination of levers, the method herein shown comprising a lever 27 pivoted near its center upon the pin 28, one end being provided with a pin 29 operatively engaging the air gate and the other end being engaged by the rod 30, the upper end of said rod terminating in an operator's push button 31 normally upheld by the compression spring 32, thus retaining the gate in a closed position excepting when operated.

The operation of my carbureter is as follows: I start the engine, the vent 24 permitting sufficient gas to flow for running at low speed; I then depress the foot button 31, which acts upon the combination of levers as above stated, raising the throttle gate 10, thus increasing the flow of gas causing the engine to run at a higher speed. It is obvious that the air passing through the mixing chamber in the direction of the arrows, will create a certain vacuum or suction along the after side of the stand pipe, thus raising the gasolene within the semi-capillary duct 13 from the reservoir to a height proportionate to the suction allowed by the position of the gate 10, and drawing the gasolene from the vents 14 in small, wavering streams which are rapidly vaporized and a thorugh mixture of the combining elements results. When it is found that the mixture is richer than desired, the air gate 9 may be suitably operated to introduce additional air into the mixture until the proper proportion is obtained; it also serves to decrease the suction along the stand pipe, thus a lower proportion of gasolene is consumed for the same amount of air. The gasolene supply is further regulated by the needle 8; and its upward flow is retarded by the atmospheric pressure introduced from the vent or duct 21, the resulting air current tending to partially neutralize the suction from without the stand pipe. The duct 21 also serves to neutralize the momentum of the gasolene flow allowing it to quickly drop to the level of the float when the throttle is suddenly closed.

After using many forms of carbureters for several years, I find that the best results are to be obtained from a carbureter employing what is commonly known as the "multiple jet" system, in which the gasolene is emitted into the mixing chamber through a plurality of small jets.

The principal objection to the present form of multiple jet carbureters is that the nozzles or jets are arranged in the same level within the mixing chamber and controlled by one regulating needle, thus any equalizing means which may be introduced will be inadequate to produce a uniform mixture, as the gasolene will flow too freely at low speed of the engine and the mixture will be too rich.

After careful experiment, I find that by using a stand pipe as hereinbefore set forth, equalization of very high efficiency may be readily obtained, and the resulting mixture will be of uniform proportions at any speed of the motor.

It is obvious from the foregoing that air passages and mixing chambers of various forms could be employed in connection with my stand pipe, and deflecting gates or other suitable means be inserted therein to crowd the air draft down upon the gasolene supply, without departing from the purport of my invention, therefore I do not wish to confine myself to the details of construction herein shown. I also find that the principles of my invention may be employed for carbureters using various forms of combustible fluid.

Having thus described my invention and its uses whereof, what I claim and desire to secure by Letters Patent is as follows:

1. In a carbureter, the combination with a fuel supply reservoir having means for maintaining a uniform liquid level therein, of an air passage, a stand pipe extending from said fuel reservoir into said air passage, an auxiliary cup within the air passage and at the base of said stand pipe, said stand pipe having openings in the suction side of its wall, one or more of said openings being below the fluid level in said cup and adapted to supply fuel from said reservoir.

2. In a carbureter, the combination, with a fuel supply reservoir having means for maintaining a uniform fluid level therein, of an air passage, a stand pipe projecting from said fuel reservoir into said air passage and having a series of minute openings in its wall extending lengthwise of said pipe on the suction side thereof, one of said openings being below the fluid level and a valve adapted to regulate the flow of fluid from said reservoir into said stand pipe, whereby said flow will be in direct proportion to the suction created within said air passage.

3. In a carbureter, the combination, with a fuel supply reservoir having means for maintaining a uniform fluid level therein, of an air passage extending across the upper portion of said reservoir, a stand pipe projecting from said fuel supply reservoir into said air passage and having a series of minute openings in its wall extending lengthwise of said pipe on the suction side thereof, said air passage having an opening above said stand pipe, and means for regulating the passage of air through said opening.

4. In a carbureter, the combination with a fuel supply reservoir provided with means for maintaining a uniform liquid level therein and having an air passage extending transversely through its upper portion, of an auxiliary supply cup within said air passage having its bottom below the level of the liquid within the reservoir, a stand pipe communicating with the reservoir and extending from said cup into the air passage, and having a series of minute openings extending lengthwise of the stand pipe, one of said openings being located below the level of the liquid within said cup and adapted to supply sufficient fuel to said cup for slow speed of the motor, and the remaining openings being adapted to discharge fluid into said air passage in proportion to the vacuum created by the suction of the motor.

5. In a carbureter, the combination with a casing, of a fuel supply reservoir, an air passage extending transversely through its upper portion, an auxiliary cup located within said air passage, and having its bottom below the level of the liquid in said reservoir, a perforated stand pipe extending from said cup into the air passage and communicating with said reservoir, one or more of said perforations being placed within said cup and below the liquid level, said air passage being of such conformity that a light draft of air through said passage will pass directly across the surface of the cup therein.

6. A carbureter comprising a mixing chamber, a fuel supply cup therein, a stand pipe projecting from said cup and having a series of perforations in its wall extending lengthwise thereof, a reservoir connected with said cup and adapted to supply liquid to said cup, one or more of said perforations being below the level of the liquid in said cup.

7. In a carbureter, an upwardly curved air pipe having a cup formed in its lower wall, a stand pipe projecting upwardly from said cup and having a series of perforations in its wall, at least one of said perforations being below the level of the liquid in said cup, and a reservoir connected with said cup and adapted to supply fuel thereto.

8. A carbureter comprising a mixing chamber, a fuel supply cup, a stand pipe having its lower end within said cup and provided with a perforation in its wall on the suction side of said pipe, below the level of the liquid in said cup, a valve concentric with said stand pipe and arranged to regulate the flow of liquid thereto, and a reservoir connected with said cup, substantially as described.

ASHLEY C. BENNETT.

Witnesses:
JOHN A. SURR,
C. F. SNOW.